Patented Dec. 18, 1923.

1,477,829

UNITED STATES PATENT OFFICE.

ERNST M. JOHANSEN, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

SULPHO COMPOUND AND ITS PRODUCTION.

No Drawing. Application filed January 25, 1921. Serial No. 439,843.

*To all whom it may concern:*

Be it known that I, ERNST M. JOHANSEN, a citizen of the United States, residing in the city and county of Philadelphia, State of Pennsylvania, have invented certain new and useful Improvements in Sulpho Compounds and Their Production, of which the following is a specification.

My invention relates to sulpho-compounds from mineral oil products, as sulfonic acids and their derivatives, as their salts, etc., and to the method of producing said compounds.

The production of sulfonic acids from mineral oils has been generally and commonly an incident to the treatment of such oils with sulphuric acid in processes having as object the simultaneous improvement and conservation of the oil as the desired or principal product. This object prevents the employment of sulfonation methods of the greatest efficiency, and this, as well as the relatively small proportion of sulfonable substances present in the oils, causes the amount of formed sulfonic acids to be small, constituting a by-product.

In accordance with my invention, however, the sulfonic acids are not a by-product, but the principal product, and are derived by such sulfonation methods as are the most efficient and best adapted for the purpose, from sources very rich in substances yielding sulfonic acids upon sulfonation.

The source of the sulfonic acids in accordance with my invention may be either non-oily crystalline or solid or semi-solid material, convertible entirely or substantially entirely into sulfonation products, or mixtures rich in said non-oily materials and consisting of relatively large proportions of said materials with relatively small proportions of oil and impurities.

As mixtures of the above character, suitable as sources of sulfonic acids, may be mentioned the highest boiling point distillates resulting from the dry or destructive (cracking) distillation of crude petroleum and shale oil; or the highest boiling point distillates resulting from the dry or destructive distillation at atmospheric or higher pressure of distillates from crude petroleum and shale oil. Distillates of this character are known as paraffine slops and wax tailings when derived from petroleum, or as chrysene or still ends when derived from shale oil. These materials, or these materials with lighter oil or oils added thereto, may be directly subjected to the sulfonating agent, and the formed sulfonic acids may be separated from the inert, unsulfonated material present; or from these materials may first be produced the aforesaid non-oily crystalline or solid or semisolid materials, which may then be subjected to the sulfonating agent with production of sulfonic acids.

After exposing wax tailings, paraffine slops or still ends at ordinary temperature to the action of suitable solvents, as 88 degree Bé. gasoline, ether, etc., the aforementioned crystalline material will separate upon standing. The same result may be obtained by dissolving the above materials in hot lamp oil, as kerosene or kerosene distillate, or equivalent petroleum oil or distillate of suitably low viscosity, allowing the solution to cool. After removal of the crystalline material from the solution, the latter will upon further cooling deposit a heavy sediment, which, upon removal of adherent solvent, will be found to be solid or semi-solid, being the aforementioned solid or semi-solid material. Oil, contained in the above mentioned materials, will be substantially separated in the removed solvent.

The crystalline material and the solid or semi-solid material consist substantially of hydrocarbons, which is the ultimate material reacting with the sulfonating agent to form sulfonic acids. They are heavier than water, non-oily, and much less soluble than oils in cold 88 degree Bé. gasoline. They are entirely or substantially entirely changed into sulfonic acids by the action of sulfonating agents, and they are therefore aromatic or non-paraffinic in nature. The crude crystalline material is dark green and consists of relatively small crystals, but may be obtained as larger crystals of pale yellow color when the crude material is purified by re-crystallization from solutions in suitable solvents, such as amyl alcohol, pyridin, etc. The melting point of the crystals varies from below 200 degrees F. to 550 degrees F. The solid or semi-solid material is clear, dark red in thin layers; is more or less hard and brittle when cold, but very ductile and adhesive when slightly warmed. It may be crystallized, although with difficulty, from suitable solvents, the obtained crystals being yellow, and having properties similar to those described above.

The above aromatic or non-paraffine substances are present in large proportions in the aforementioned sources. For example, in paraffine slops, 15 degree Bé., there may be present from 40 to 45 per cent of these substances, and in very hard wax tailings, solid or substantially so at ordinary temperatures, 90 per cent or more of these substances may be found.

As sulfonating agents may be used sulphuric acid of varying strength, including fuming sulphuric acid, or a polysulfate, as sodium polysulfate, comprising a suitable mixture of nitre cake and sulphuric acid. It will in general be understood that the stronger sulphuric acids act as sulfonating agents at relatively lower temperatures, while a higher sulfonation temperature must be employed when weaker acids or polysulfates are used for sulfonation.

The aforesaid crystalline material and solid or semi-solid material, either alone or in mixtures, such as wax tailings, etc., may be easily and completely sulfonated by any suitable sulfonation method, i. e., by producing intimate contact, as by stirring, between suitable proportions of the materials and the sulfonation agent at suitable temperatures. To facilitate the contact, the crystals, as such, may be finely powdered; or the solid or semi-solid material, wax tailings, paraffine slops or still ends may be rendered fluid or liquefied by warming, or preferably by mixing or diluting with a lighter mineral oil. The sulfonic acids formed during the reaction are soluble in sulphuric acid to a limited extent only, and the sulfonation product will therefore consist of a solution or a doughy or pasty mass, depending upon the greater or smaller proportion of sulphuric acid to the material. The contact between sulphuric acid and material is continued until a sample of the sulfonation product dissolves in water which is preferably warm. This solution has a green or blue color, and is clear when crystalline material has been sulfonated. If any oil or impurities are present, a somewhat turbid solution will result, from which oil and impurities will separate, leaving the solution clear.

The sulfonation products resulting from sulfonation by sulphuric acid contain sulfonic acid and sulphuric acid, and in the case of sulfonation or any of the above described mixtures, as distinguished from the crystals or crystalline materials themselves, unsulfonated material, such as oil and impurities. The sulphuric acid may be removed by any convenient method, such as by leaching or agitating the sulfonation product with hot or cold water, with or without application of live steam, so as to produce dilute sulphuric acid of a strength in which the sulfonic acids are but slightly soluble. The dilute sulphuric acid may then be allowed to separate, and is removed. The remaining substance is then treated with enough water to dissolve the sulfonic acids, allowing the oil and impurities to separate and removing the same, thereby obtaining an aqueous solution of sulfonic acids, from which the acids may be recovered.

Or, the sulfonation product may be treated with hot or cold water, with or without application of live steam, until entirely dissolved, allowing the oil and impurities to separate and removing the same. From the solution, which contains sulfonic and sulphuric acids, the latter may be removed by the addition of the necessary amount of a hydroxide or carbonate which will produce an insoluble sulfate with the sulphuric acid. The insoluble sulfate is removed, leaving a solution of sulfonic acids.

Sulfonates, or salts of the sulfonic acids, may be produced from solutions of sulfonic acids as prepared above by neutralization of the solutions with suitable hydroxides, carbonates or equivalent reagents. It is more advantageous to neutralize the solutions in the presence of the impurities and oil of the mixture sulfonated than after the impurities and oil have been removed, as in the former case more impurities will separate out and dissolve in the oil, thus producing a purer solution of sulfonates.

Or the sulfonation product may be directly subjected to the action of solutions of the above mentioned hydroxides, carbonates or equivalent reagents, whereby there is directly produced an equeous solution of water soluble sulfonates, from which any impurities and oil are allowed to separate and are removed.

In any of the aforementioned cases, the last traces of impurities may be removed by extracting these from the solution of sulfonic acids or, perferably, sulfonates, by a solvent, as naphtha, benzol, etc., in which the impurities dissolve, the solvent being immiscible with water and without action upon the sulfonic acids or sulfonates.

The sulfonates so procured may be produced in solid form from the solution by any of the well known methods, as by evaporation, salting out, etc.

Of the above mentioned sources, wax tailings are preferred, though it will be understood that my invention is not limited in this respect except where so expressly stated in the appended claims. It has been found that from one hundred pounds of soft wax tailings sulfonated at 125 degrees F., using two hundred pounds of 66 degree Bé. sulphuric acid, one hundred twenty-five pounds of water soluble sulfonates were obtained. From very soft wax tailings, sulfonated under the same conditions, seventy-three pounds of sulfonates were produced, while from paraffine slops of 15 degree Bé. gravity fifty-five pounds of sulfonates were produced.

The sulfonic acids produced as heretofore described are dark solid substances, practically odorless, brittle and easly powdered, yielding dark green powders; this characteristic color is not removed or decreased by purification. These sulfonic acids dissolve easily in water, hot or cold, and have when in aqueous solution decidedly colloidal properties; that is, they do not crystallize, can not be dialyzed, lower the surface tension of water, and may be salted out by electrolytes. These sulfonic acids dissolve readily in alcohol of fifty per cent strength, and less readily in strong alcohol. They are only slightly soluble in ether, benzol, chloroform or petroleum hydrocarbons. They are to some extent soluble in concentrated sulphuric acid, yielding solutions green or blue in color, which upon dilution with much water remain clear.

The herein described sulfonates, such, for example, as those formed by neutralizing the herein described sulfonic acids with water soluble bases to form neutral salts, are dark brittle substances, easily powdered, yielding brown powders, practically odorless. Their color is not removed or lessened by puification. These salts are very soluble in water, and exhibit in aqueous solutions colloidal characteristics similar to those of the sulfonic acids above described, though in much higher degree. They greatly lower the surface tension of water, yielding strongly foaming or soapy solutions, and they are therefore suitable for detergent purposes, the production as well as breaking of emulsions, or in any other relation in which soaps are utilizable. They are soluble in 50 per cent alcohol, less so in strong alcohol. They are only slightly soluble in ether, benzol, chloroform or petroleum hydrocarbons.

The salts of the sulfonic acids with aluminum, lead or other heavy metals are little soluble in water or dilute alcohol. They are soluble, however, in aqueous solutions containing even relatively small amounts of sodium sulfate, carbonate or chloride.

For the sake of brevity in the appended claims, such phraseology as high boiling point distillate resulting from destructive distillation of mineral oil, including petroleum, refers to paraffine slops and (or) wax tailings resulting from destructive distillation of petroleum, and chrysene or still ends resulting from destructive distillation of shale oil.

What I claim is:

1. The method of producing sulpho-compounds, which comprises sulfonating non-oily crystalline or crystallizable bodies having as their source a high boiling point distillate from destructive distillation of mineral oil.

2. In a method of producing sulpho-compounds, the step which consists in subjecting to a sulfonating agent the non-oily red material derived from a high boiling point distillate resulting from the destructive distillation of mineral oil.

3. In a method of producing sulpho-compounds, the step which consists in subjecting a high boiling point distillate resulting from destructive distillation of mineral oil to a sulfonating agent.

4. In a method of producing sulpho-compounds, the step which consists in subjecting wax tailings to a sulfonating agent.

5. In a method of producing sulpho-compounds, the steps which consist in diluting with a lighter oil a high boiling point distillate resulting from destructive distillation of mineral oil, and subjecting the mixture to a sulfonating agent.

6. In a method of producing sulpho-compounds, the steps which consist in diluting wax tailings with a lighter oil, and subjecting the mixture to a sulfonating agent.

7. The method of producing sulpho-compounds, which consists in subjecting wax tailings to sulphuric acid, treating the resultant mixture with water, allowing the resultant dilute sulphuric acid to separate and removing the same, subjecting the oily material and the sulfonic acids present simultaneously to the action of a neutralizing agent, and separating the neutralized sulfonic acids from the oily material.

8. The method of producing sulpho-compounds, which consists in subjecting wax tailings diluted with a lighter oil to sulphuric acid, treating the resultant mixture with water, separating the resultant dilute sulphuric acid, subjecting the oily material and the sulfonic acids present simultaneously to the action of a neutralizing agent, and separating the neutralized sulfonic acids from the oily material.

9. In a method of producing sulpho-compounds, the steps which comprise mixing with a diluting mineral oil the non-oily red material derived from a high boiling point distillate from the destructive distillation of mineral oil, and subjecting the mixture to a sulfonating agent.

10. The product consisting of sulfonic compounds derived from sulfonation of a sulfonable content of a high boiling point distillate resulting from destructive distillation of petroleum.

11. The product consisting of sulfonic compounds derived from sulfonation of a sulfonable content of wax tailings.

12. The product comprising water soluble sulfonic compounds derived from sulfonation of a sulfonable content of a high boiling point distillate resulting from destructive distillation of mineral oil.

In testimony whereof I have hereunto affixed my signature this 22nd day of January, 1921.

ERNST M. JOHANSEN.